United States Patent [19]

Hara et al.

[11] Patent Number: 4,947,441

[45] Date of Patent: Aug. 7, 1990

[54] BILL DISCRIMINATING APPARATUS

[75] Inventors: Kazuhiro Hara, Chiba; Kiyosi Fujii, Tokyo, both of Japan

[73] Assignee: Laurel Bank Machine Co., Ltd., Tokyo, Japan

[21] Appl. No.: 351,522

[22] Filed: May 15, 1989

[30] Foreign Application Priority Data

May 20, 1988 [JP] Japan ............................... 63-123362
May 8, 1989 [JP] Japan ................................. 1-114677

[51] Int. Cl.[5] ................................................ G06K 9/00

[52] U.S. Cl. ........................................... 382/7; 382/50; 356/71

[58] Field of Search .................... 382/7, 17, 65, 22, 24, 382/29, 67, 50; 250/556, 557, 559, 571, 226; 209/534; 356/71

[56] References Cited

U.S. PATENT DOCUMENTS 4,183,665 1/1980 Iannedrea et al. .................. 250/556
4,592,090 5/1986 Curl et al. ........................... 250/556
4,618,257 10/1986 Bayne et al. .......................... 356/71
4,749,087 6/1988 Buttifant ................................ 382/7
4,881,268 11/1989 Uchida et al. .......................... 382/7

FOREIGN PATENT DOCUMENTS 62-296292 12/1987 Japan .

*Primary Examiner*—Leo H. Boudreau
*Attorney, Agent, or Firm*—Fleit, Jacobson, Cohn, Price, Holman & Stern

[57] ABSTRACT

A bill discriminating apparatus having two color detectors for photoelectrically detecting light components contained in light transmitted through or reflected by bills to be discriminated and having different wavelengths from each other, the bill discriminating apparatus including a current correction circuit for correcting current output from one of the two color detectors, two amplifiers for amplifying the current output from one of the two color detectors and current output from the other color detector, a gain adjusting circuit capable of adjusting gain of one of the two amplifiers, a differential amplifier for differentially amplifying signals output from the two amplifiers and a discriminator for discriminating denominations and/or genuineness of the bills based upon signals output from the differential amplifier. The thus constituted bill discriminating apparatus makes it possible to discriminate denominations and/or genuineness of the bills without fail.

8 Claims, 1 Drawing Sheet

BILL DISCRIMINATING APPARATUS

CROSS REFERENCE OF RELATED APPLICATIONS

The present invention relates generally to the subject matter of the following prior U.S. patent application: Ser. No. 07/056,716, filed on June 2, 1987, entitled "Paper Money Discriminator", now U.S. Pat. No. 4,881,268.

BACKGROUND OF THE INVENTION

The present invention relates to a bill discriminating apparatus, and more particularly to such an apparatus capable of discriminating denominations and/or genuineness of bills without fail by detecting colors of bills.

DESCRIPTION OF THE PRIOR ART

There are known bill discriminating apparatuses for discriminating denominations and/or genuineness of bills by detecting colors of bills.

For example, unexamined Japanese Patent Publication No. 62(1987)-296292 corresponding to the U.S. patent application Ser. No. 07/056,716 proposes a bill discriminating apparatus in which a plurality of color sensors are provided in the longitudinal direction of bills being transported, each color sensor comprising a pair of color detecting means for detecting different color components of light transmitted through or reflected by bills from each other, ratios of two kinds of color components detected by the color sensors are calculated in time series to produce time-series patterns of bills and denominations and/or genuineness of bills are discriminated by comparing the thus produced time-series patterns of bills with reference patterns of bills experimentally obtained and memorized.

In this bill discriminating apparatus, two colors to be detected are selected from three primary colors and the bill discrimination is conducted based upon ratios of the components of two colors contained in light transmitted through or reflected by bills. However, since bill are printed with various colors for preventing counterfeiting, totally error-free discrimination of denominations and/or genuineness of all of the world's currencies cannot be easily accomplished by detecting only two specific color components and comparing the patterns of time-series changes thereof with reference patterns.

More specifically, it is relatively easy to discriminate bills with colors having similar spectra to that of the color of the bill paper base by comparing the patterns of time-series change in the detected amount of two color components with the reference patterns, since the amount of only a specific color component of the three primary colors becomes greater when light transmitted through or reflected by bills is detected. On the contrary, in the case of bills with colors having much different spectra from that of the color of the bill paper base such as bills made by printing a yellow bill paper base with a blue color ink, the differences among the spectra of the three primary colors in light transmitted through or reflected by bills become smaller and closely resemble those of achromatic color. Thus, it is difficult to discriminate such bills from counterfeit bills made as black and white copies, even if two of the three primary colors, for example, red light and green, are selectively detected and patterns of time-series change in the ratios of the amount of light detected are compared with the reference patterns for discriminating denominations and/or genuineness of bills. It is therefore impossible to discriminate bills with sufficiently high accuracy.

Particularly, since the white and black of counterfeit bills made as black and white copies, that is, as copies having the color of the copying paper base and the color of a toner are, neither white nor black in the sense of chromatics and have some hues, the counterfeit bills made by black and white copies are not completely achromatic. Therefore, it is still more difficult to discriminate between the bills with a color having much different spectra from that of the color of the bill paper base and counterfeit bills made as black and white copies, even if the color sensors are adjusted so that their outputs become zero when they detect the color of the copy paper base for distinguishing the counterfeit bills from genuine bills.

SUMMARY OF THE INVENTION

It is, therefore, an object of the present invention to provide a bill discriminating apparatus capable of discriminating denominations and/or genuineness of bills without fail by detecting colors of bills.

Another object of the present invention is to provide a bill discriminating apparatus capable of discriminating counterfeit bills from genuine bills without fail.

According to the present invention, the above and other objects can be accomplished by a bill discriminating apparatus having at least two color detecting means for photoelectrically detecting light components contained in light transmitted through or reflected by bills to be discriminated and having different wavelengths, said bill discriminating apparatus comprising current correction means for correcting current output from at least one of said at least two color detecting means, at least two amplifying means for amplifying the current output from said at least one of said at least two color detecting means and current output from said other of said at least two color detecting means, gain adjusting means capable of adjusting gain of at least one of said at least two amplifying means, differential amplifying means for differentially amplifying signals output from said at least two amplifying means and discriminating means for discriminating denominations and/or genuineness of the bills based upon signals output from said differential amplifying means.

The above and other objects and features of the present invention will become apparent from the following description made with reference to an accompanying drawing.

DESCRIPTION OF THE PREFERRED EMBODIMENT

Figure 1:
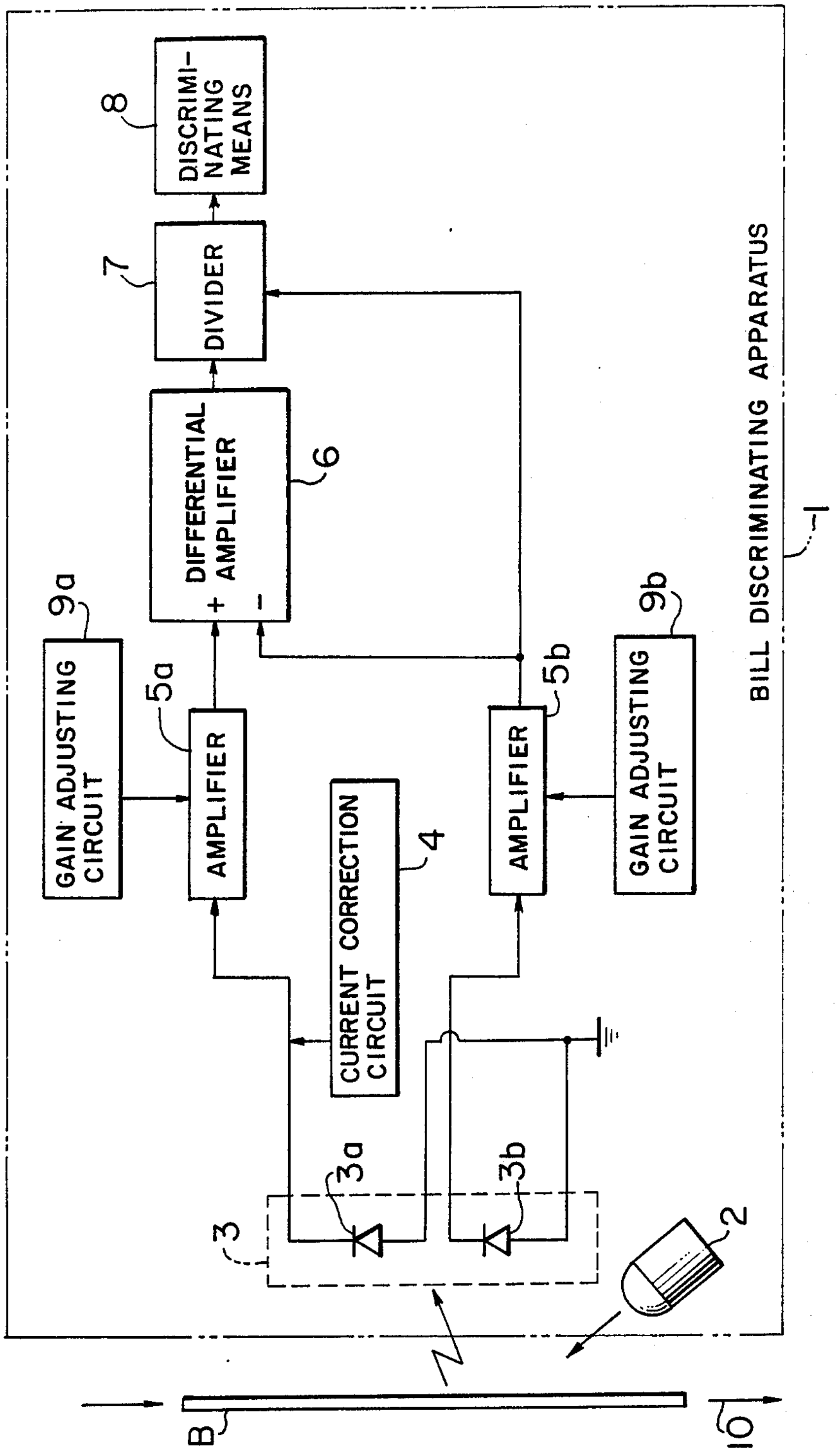
FIG. 1 is a schematic block diagram of a bill discriminating apparatus which is an embodiment of the present invention.

Referring to FIG. 1, a bill discriminating apparatus 1 which is an embodiment of the present invention is provided with a light emitter 2 for emitting light onto bills B being transported to scan them line by line and a color sensor 3 comprising a green light detecting element 3*a* and a red light detecting element 3*b* for photoelectrically detecting reflected light emitted from the light emitter 2 and reflected by the bills B.

The green light detecting element 3*a* and the red light detecting element 3*b* respectively have selective sensitivity to the spectra of the green light and the red light and detect only a green light component and a red light component contained in the reflected light from the bills B.

Further, there are provided a current correction circuit 4 for correcting output current $I_a$ from the green light detecting element **3*a* by supplying correction current $I_c$, amplifiers 5*a*, 5*b* for respectively converting to voltage and amplifying the current $(I_a+I_c)$ produced by correcting the output current $I_a$ output from the green light detecting element 3*a* with the correction current $I_c$ supplied from the current correction circuit 4 and output current $I_b$ output from the red light detecting element 3*b*, a differential amplifier 6 for differentially amplifying output signals from the amplifiers 5*a*, 5*b* and a divider 7 for dividing an output signal from the differential amplifier 6 by the output signal of the amplifier 5*b*. Output signals of the divider 7 are fed to a discriminating means 8 where discrimination of denomination and genuineness of the bills B is carried out. In FIG. 1, the reference numerals 9*a* and 9*b* designate gain adjusting circuits for adjusting gain of the amplifiers 5*a*, 5*b***.

The correction current $I_c$ and the gains of the amplifier **5*a*, 5*b* are determined so that the output of the differential amplifier 6 is zero when the reflected light is reflected by counterfeit bills made as black and white copies. More specifically, supposing that the gain of the amplifiers 5*a*, 5*b* is $A_a$, $A_b$ and the gain of the differential amplifier 6 is $A_d$, then the output voltage $V_0$ of the differential amplifier 6** will be:

$$V_0=A_d\{A_a(I_a+I_c)-A_bI_b\} \quad (1)$$

and supposing that a characteristic coefficient of the divider 7 is M, then the output voltage V of the divider 7 will be:

$$\begin{aligned} V &= MV_0/A_bI_b \\ &= MA_d\{A_a(I_a+I_c)-A_bI_b\}/A_bI_b \end{aligned} \quad (2)$$

Therefore, assuming that the output current from the green light detecting element **3*a* and that from the red light detecting element 3*b* are respectively $I_{aw}$, $I_{bw}$ when the color of the copy paper base, that is, the white of the copy paper base, is detected and that the output current from the green light detecting element 3*a* and that from the red light detecting element 3*b* are respectively $I_{ab}$, $I_{bb}$ when the black of the copy paper base, that is, the color of the toner, is detected, then, if the following formulas are satisfied, the output voltage V of the divider 7** becomes zero.

$$A_a(I_{aw}+I_c)-A_bI_{bw}=0 \quad (3)$$

$$A_a(I_{ab}+I_c)-A_bI_{bb}=0 \quad (4)$$

Accordingly, based upon the formulas (3) and (4), if the gains of the amplifiers **5*a*, 5*b* are adjusted by the gain adjusting circuit 9*a*, 9*b* and the value of the correction current $I_c$ is adjusted so that the following formulas are satisfied, it is possible to set the output voltage V of the divider 7** at zero.

$$A_a=A_b(I_{bw}-I_{bb})/(I_{aw}-I_{ab}) \quad (5)$$

$$I_c=(I_{aw}I_{bb}-I_{bw}I_{ab})/(I_{bw}-I_{bb}) \quad (6)$$

When the gain of the amplifiers **5*a*, 5*b* and the correction current $I_c$ are thus determined, the output voltage V of the divider 7** will be:

$$MA_dA_b\{(I_{bw}-I_{bb})I_a+(I_{aw}I_{bb}-I_{bw}I_{ab})-(I_{aw}-I_{ab})I_b\}/A_bI_b(I_{aw}-I_{ab}) \quad (7)$$

Further, supposing that the ratio of the area coated by the toner to the remaining area within a region of the black and white copy corresponding to a pixel of the bill B within which a color of the bill B is to be detected, that is, the coverage ratio of toner, is x, then the output current $I_a$ from the green light detecting element **3*a* and the output current $I_b$ from the red light detecting element 3*b*** will be:

$$I_a=I_{aw}(1-x)+xI_{ab} \quad (8)$$

$$I_b=I_{bw}(1-x)+xI_{bb} \quad (9)$$

and when the formulas (8) and (9) are substituted for the formula (7), V is always zero and, therefore, the output voltage V of the divider 7 is always zero for the counterfeit bills made as black and white copies, independently of the coverage ratio x of the toner within the pixel of the bills B.

Consequently, if the gains $A_a$, $A_b$ of the amplifiers **5*a*, 5*b* are respectively determined by the gain adjusting circuits 9*a*, 9*b* and the value of the correction current $I_c$ to be supplied by the correction current circuit 4** is determined in such a manner that they satisfy the formulas (5) and (6), the counterfeit bills made as the black and white copies can be discriminated from genuine bills without fail. As a result, although it is difficult to discriminate denominations of the bills B with colors having much different spectra from that of the color of the bill paper base, such as bills made by printing a yellow bill paper base with a blue color ink, since differences among the spectra of the three primary colors in the reflected light from the bills B are too small and they closely resemble those of achromatic color, it is possible to discriminate the denominations of these types of bills with sufficiently high accuracy, it is possible to discriminate the counterfeit bills made by the black and white copies from genuine bills as well as denominations thereof with sufficiently high accuracy.

Further, if the amount of light emitted from the light emitter 2 should change with elapse of time, or if the characteristics of the green light detecting element **3*a* and the red light detecting element 3*b* or the amplifiers 5*a*, 5*b* should change with elapse of time or change in temperature, since the value of the correction current $I_c$ is very small as compared with the output current $I_a$ of the green light detecting element 3*a* and the output current $I_b$ of the red light detecting element 3*b* and is negligible, and $A_aI_a$ and $A_bI_b$ are normally changed in a similar manner, the influence of the above mentioned changes on the output voltage V of the divider 7 can be canceled by dividing the output voltage V0 of the differential amplifier 6 by the output voltage of the amplifier 5*b* and the change in the output voltage V is negligible. Still further, even if the above mentioned changes occur, if the gains $A_a$, $A_b$ of the amplifiers 5*a*, 5*b* are adjusted by the gain adjusting circuits 9*a*, 9*b* and the value of the correction current $I_c$ is adjusted so that the formulas (5) and (6) are satisfied again, it is possible to always set the output voltage V of the divider 7** at zero when a counterfeit bill made as a black and white copy is detected.

After initially adjusting the gain $A_a$ and $A_b$ of the amplifiers 5a, 5b by the gain adjusting circuits 9a, 9b and the value of the correction current $I_c$ to be supplied from the correction current circuit 4 so that the formulas (5) and (6) are satisfied, the bills B are transported along a bill transporting path 10 and scanned line by line by the light emitter 2 and light reflected by the bills B is photoelectrically read out by the green light detecting element 3a and the red light detecting element 3b. Further, after the output current $I_a$ of the green light detecting element 3a is corrected by the correction current $I_c$ supplied from the correction current circuit 4, the thus corrected output current $(I_a+I_c)$ of the green light detecting element 3a and the output current $I_b$ of the red light detecting element 3b are respectively converted to voltages and amplified with the gain $A_a$, $A_b$ by the amplifiers 5a, 5b and the difference between the output voltage of the amplifiers 5a, 5b is differentially amplified by the differential amplifier 6. The output voltage $V_0$ of the differential amplifier 6 is fed to the divider 7 where it is divided by the output voltage of the amplifier 5b and then is fed to the discriminating means 8 to discriminate denominations and genuineness of the bills B.

Reference patterns for respective denominations of the bills B are stored in advance in the discriminating means 8 and the time-series pattern of the signals which have been detected by scanning the bills B line by line by the light emitter 2 and on which the above described signal processings have been conducted is compared with the reference patterns and the denomination of the bills B is discriminated depending upon agreement between the detected pattern and one of the reference patterns. As described above, since when the counterfeit bills made as black and white copies are detected, the output voltage V of the divider 7 is zero, the detected signals of the counterfeit bills made by the black and white copies cannot accord with one of the reference patterns and, therefore, it is possible to discriminate the counterfeit bills made as black and white copies from genuine bills without fail.

According to the above described embodiment, since the value of the correction current $I_c$ and the gains $A_a$, $A_b$ of the amplifiers 5a, 5b are determined so that the detected signals of the counterfeit bills made as black and white copies are always zero, it is possible to discriminate the counterfeit bills made as black and white copies from genuine bills and, therefore, it becomes possible to discriminate with sufficiently high accuracy the denomination of bills having colors similar to a achromatic color which in the past have been difficult to distinguish from the counterfeit bills made as black and white copies, whereby the denominations and genuineness of bills can be discriminated with sufficiently high accuracy.

As described in detail with reference to the preferred embodiment, according to the present invention, it is possible to provide a bill discriminating apparatus capable of discriminating denominations and genuineness of bills without fail by detecting colors of bills.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, although the light reflected from the bills B is detected by the green light detecting element 3a and the red light detecting element 3b which respectively have selective sensitivity to the spectra of the green light and the red light and photoelectrically detect only a green light component and a red light component contained in the reflected light from the bills B, specific wavelengths of light can instead be detected using photoelectrically detecting elements provided with filters capable of transmitting the green light component or the red light component on the front face thereof.

Further, in the above described embodiment, although red light and green light are selectively detected among the three primary colors, red light and blue light, green light and blue light or red light, green light and blue light may be selectively detected.

Still further, in the above described embodiment, although the reflected light from the bill B is detected, light transmitted through the bills B can instead be detected by arranging the light emitter 2 on the opposite side of the color sensor 3 across the bill transporting path 10.

Moreover, in the above described embodiment, although the output current of the green light detecting element 3a is corrected by the correction current circuit 4, the output current of the red light detecting element 3b or the output current of the green light detecting element 3a and the red light detecting element 3b can be corrected and it is sufficient to provide at least two light detecting elements for selectively detecting two colors among red, green and blue and to correct one of the output currents from at least two light detecting elements.

Furthermore, in the above described embodiment, although the gain adjusting circuits 9a, 9b are provided and the gain of both the amplifiers 5a, 5b is adjusted so that the formula (5) is satisfied by them, it is possible to adjust the gain of one of the amplifiers 5a, 5b so that the formula (5) is satisfied.

Further, in the above described embodiment, although the divider 7 is provided for preventing the discrimination accuracy from being degraded even if the amount of light emitted from the light emitter 2 changes with elapse of time, or the characteristics of the green light detecting element 3a, the red light detecting element 3b or the amplifiers 5a, 5b change with elapse of time or change in temperature, the divider 7 is not an indispensable means, an the same effect can be had by adjusting the gain $A_a$, $A_b$ of the amplifiers 5a, 5b and the value of the correction current $I_c$ as occasion demands.

Moreover, in the above described embodiment, although the bills B are scanned line by line by light emitted from the light emitter 2, the bills B may be scanned point by point by light emitted from the light emitter 2.

We claim:

1. A bill discriminating apparatus having at least two color detecting means for photoelectrically detecting light components contained in light transmitted through or reflected by bills to be discriminated and having different wavelengths, said bill discriminating apparatus comprising current correction means for correcting current output from at least one of said at least two color detecting means, at least two amplifying means for amplifying the current output from said at least one of said at least two color detecting means and current output from said other of said at least two color detecting means, gain adjusting means capable of adjusting gain of at least one of said at least two amplifying means, differential amplifying means for differentially amplifying signals output from said at least two amplifying means and discriminating means for discriminating denominations and/or genuineness of the bills based upon signals output from said differential amplifying means.

2. A bill discriminating apparatus in accordance with claim 1 which further includes dividing means for dividing the signals output from said differential amplifying means by the signals output from one of said at least two amplifying means and in which said discriminating means discriminates denominations and/or genuineness of the bills based upon signals output from said dividing means.

3. A bill discriminating apparatus in accordance with claim 1 wherein said at least two color detecting means consist of green light detecting means for selectively detecting the green light and red light detecting means for selectively detecting the red light.

4. A bill discriminating apparatus in accordance with claim 3 which further includes dividing means for dividing the signals output from said differential amplifying means by the signals output from one of said at least two amplifying means and in which said discriminating means discriminates denominations and/or genuineness of the bills based upon signals output from said dividing means.

5. A bill discriminating apparatus in accordance with claim 3 wherein said current correction means corrects the current output from one of said green light detecting means and said red light detecting means.

6. A bill discriminating apparatus in accordance with claim 5 wherein said at least two amplifying means consist of two amplifying means for respectively amplifying the current output from one of said green light detecting means and said red light detecting means and corrected by said current correction means and the current output from the other of the green light detecting means and the red light detecting means, and said gain adjusting means consists of two gain adjusting means, each capable of adjusting the gain of one of said two amplifying means.

7. A bill discriminating apparatus in accordance with claim 5 which further includes dividing means for dividing the signals output from said differential amplifying means by the signals output from one of said at least two amplifying means and in which said discriminating means discriminates denominations and/or genuineness of the bills based upon signals output from said dividing means.

8. A bill discriminating apparatus in accordance with claim 6 which further includes dividing means for dividing the signals output from said differential amplifying means by the signals output from one of said at least two amplifying means and in which said discriminating means discriminates denominations and/or genuineness of the bills based upon signals output from said dividing means.

* * * * *